(12) United States Patent
Fukami

(10) Patent No.: US 9,453,504 B2
(45) Date of Patent: Sep. 27, 2016

(54) DIAPHRAGM PUMP

(75) Inventor: Tadashi Fukami, Tokyo (JP)

(73) Assignee: OKENSEIKO CO., LTD., Tokyo (JP)

( * ) Notice: Subject to any disclaimer, the term of this patent is extended or adjusted under 35 U.S.C. 154(b) by 164 days.

(21) Appl. No.: 14/131,901

(22) PCT Filed: Jul. 11, 2012

(86) PCT No.: PCT/JP2012/067657
§ 371 (c)(1),
(2), (4) Date: Jan. 9, 2014

(87) PCT Pub. No.: WO2013/008833
PCT Pub. Date: Jan. 17, 2013

(65) Prior Publication Data
US 2014/0154117 A1    Jun. 5, 2014

(30) Foreign Application Priority Data

Jul. 11, 2011  (JP) .................................. 2011-152504
Jul. 11, 2011  (JP) .................................. 2011-152505

(51) Int. Cl.
*F04B 45/04*    (2006.01)
*F04B 43/02*    (2006.01)
*F16H 23/04*    (2006.01)

(52) U.S. Cl.
CPC ............. *F04B 43/02* (2013.01); *F04B 43/026* (2013.01); *F04B 45/04* (2013.01); *F16H 23/04* (2013.01)

(58) Field of Classification Search
CPC .......... F04B 43/02; F04B 43/04; F04B 9/02; F04B 9/04; F04B 9/042; F04B 9/045; F04B 9/047; F04B 27/1054; F04B 27/102; F04B 27/1072; F04B 1/14; F04B 1/146; F16H 23/00; F16H 23/04; F16H 23/06; F16H 23/08; F03C 1/0631
USPC ................................................ 417/269, 473
See application file for complete search history.

(56) References Cited

U.S. PATENT DOCUMENTS

| 4,486,151 A | * | 12/1984 | Korhonen-Wesala ............... F04B 43/1207 417/222.1 |
| 5,165,866 A | * | 11/1992 | Kato ....................... F04B 43/08 417/360 |
| 6,158,971 A | * | 12/2000 | Takagi .................. F04B 43/026 417/244 |
| 6,264,438 B1 | | 7/2001 | Fukami |
| 7,819,636 B2 | | 10/2010 | Huang |

FOREIGN PATENT DOCUMENTS

| JP | S62-291484 A | 12/1987 |
| JP | 2003-120521 A | 4/2003 |
| JP | 2003-120523 | 4/2003 |
| JP | 2004-324637 A | 11/2004 |
| JP | 2009-024611 | 2/2009 |

OTHER PUBLICATIONS

Extended European Search Report, dated Nov. 9, 2015, European Application No. 12811711.

* cited by examiner

*Primary Examiner* — Charles Freay
*Assistant Examiner* — Philip Stimpert
(74) *Attorney, Agent, or Firm* — Blakely Sokoloff Taylor & Zafman LLP

(57) ABSTRACT

This invention provides a diaphragm pump that decreases the number of components or improves workability in assembling. A crank (4) to which the output shaft (2a) of a motor (2) is pivotally attached has, in its upper surface, a ring-shaped insertion groove (5) with respect to the output shaft (2a) as the center. A projecting driving shaft (9b) is formed integrally with a driver (7). When the lower end (9c) of the driving shaft (9b) is inserted into the insertion groove (5), the axis (9d) tilts. When the crank (4) rotates, an engaging portion provided in the insertion groove (5) engages with the lower end (9c). The driving shaft (9b) rotates while changing the tilt direction of the axis (9d) following the rotation of the crank (4). Hence, when a diaphragm portion (12a) attached to the drive element (7a) of the driver (7) moves upward/downward, a pump chamber (18) expands/contracts so that a pump action is obtained.

6 Claims, 8 Drawing Sheets

DIAPHRAGM PUMP

TECHNICAL FIELD

The present invention relates to a diaphragm pump used to pressurize or depressurize a fluid supplied to a sphygmomanometer, household electric appliances, or the like.

BACKGROUND ART

A diaphragm pump of this type includes a motor serving as a driving source, a crank that rotates upon driving of the motor, a driving shaft fixed to a portion displaced from the rotation center of the crank while having one end tilted with respect to the rotation axis of the crank, a driver having a non-through hole for receiving the other end of the driving shaft and pivotally supported by the driving shaft to be rotatable, and a diaphragm to which a diaphragm portion configured to form a pump chamber at each oscillation end of the driver is attached (see patent literature 1).

In the diaphragm pump described in patent literature 1, when the crank rotates upon driving of the motor, the driving shaft rotates about the output shaft of the motor while changing its tilt direction. The oscillation ends of the driver thus sequentially reciprocally move. Hence, the pump chambers sequentially expand and contract. When the pump chamber expands, air is sucked from the atmosphere into the pump chamber. When the pump chamber contracts next, the air in it is supplied to a pressurization target such as a sphygmomanometer.

RELATED ART LITERATURE

Patent Literature

Patent Literature 1: Japanese Patent Laid-Open No. 62-291484

DISCLOSURE OF INVENTION

Problem to be Solved by the Invention

In the above-described diaphragm pump, the driving shaft that transmits the rotation operation of the crank to the driver as an oscillation operation is formed from a member different from the driver. It is therefore impossible to decrease the number of components.

When assembling the diaphragm pump, one end of the driving shaft is fixed in advance to the crank attached to the output shaft of the motor. Additionally, the diaphragm portions of the diaphragm are attached to the oscillation ends of the driver, respectively. Then, the other end of the driving shaft is inserted into the non-through hole provided in the driver. In the operation of inserting the driving shaft into the non-through hole, the non-through hole needs to be fitted, from above, on the driving shaft tilted with respect to the vertical direction in a state in which the opening of the non-through hole is orientated downward, that is, in a state in which the opening portion cannot be visually confirmed. This operation is cumbersome and needs experience and skill, leading to not only poor workability but also a bottleneck in assembly automation.

It is an object of the present invention to provide a diaphragm pump that decreases the number of components.

It is another object of the present invention to provide a diaphragm pump that improves workability in assembling and facilitates introduction of assembly automation.

Means of Solution to the Problem

In order to achieve the above-described object, according to the present invention, there is provided a diaphragm pump comprising a motor serving as a driving source, a crank that is rotated by the motor and has a ring-shaped insertion groove in an upper surface, a pump chamber that is formed from a diaphragm including a diaphragm portion and expands/contracts in accordance with reciprocal motion of the diaphragm portion, a driver that reciprocally moves the diaphragm portion by an oscillation operation, a driving shaft that projects from the driver and engages with the insertion groove of the crank with respect to a rotation axis of the crank as a center, and an engaging portion that is formed in the insertion groove, and engages with the driving shaft to make the driving shaft follow the rotation of the crank, wherein the driving shaft and the driver are integrally formed from a single material or different materials.

According to the present invention, there is also provided a diaphragm pump comprising a motor serving as a driving source, a crank that is rotated by the motor, a pump chamber that is formed from a diaphragm including a diaphragm portion and expands/contracts in accordance with reciprocal motion of the diaphragm portion, a driver that reciprocally moves the diaphragm portion by an oscillation operation, a driving shaft that projects from the driver and is connected to the crank, converts a rotation operation of the crank into an oscillation operation of the driver, and is pivotally supported to be rotatable at a portion displaced from a rotation axis of the crank while tilting with respect to the rotation axis, wherein the driving shaft and the driver are integrally formed from a single material.

Effect of the Invention

According to the present invention, since the driving shaft is formed integrally with the driver, the number of components can be decreased. In addition, the step of pivotally attaching the driving shaft in a tilted state to the crank is unnecessary.

In addition, since the driving shaft is inserted into not a hole but the insertion groove formed into a ring shape, the insertion operation becomes easy, and workability in assembly improves. Since the driving shaft is guided by the guide portion into the insertion groove, the driving shaft need not be aligned with the insertion groove at the time of assembly. It is therefore possible to easily introduce assembly automation.

Furthermore, since the driver is sandwiched between the crank and the diaphragm holder, the oscillation operation of the driver stabilizes, and the expansion/contraction operation of the pump chamber also stabilizes. It is therefore possible to regulate the pulsating flow of the supplied fluid.

BEST MODE FOR CARRYING OUT THE INVENTION

Figure 1:
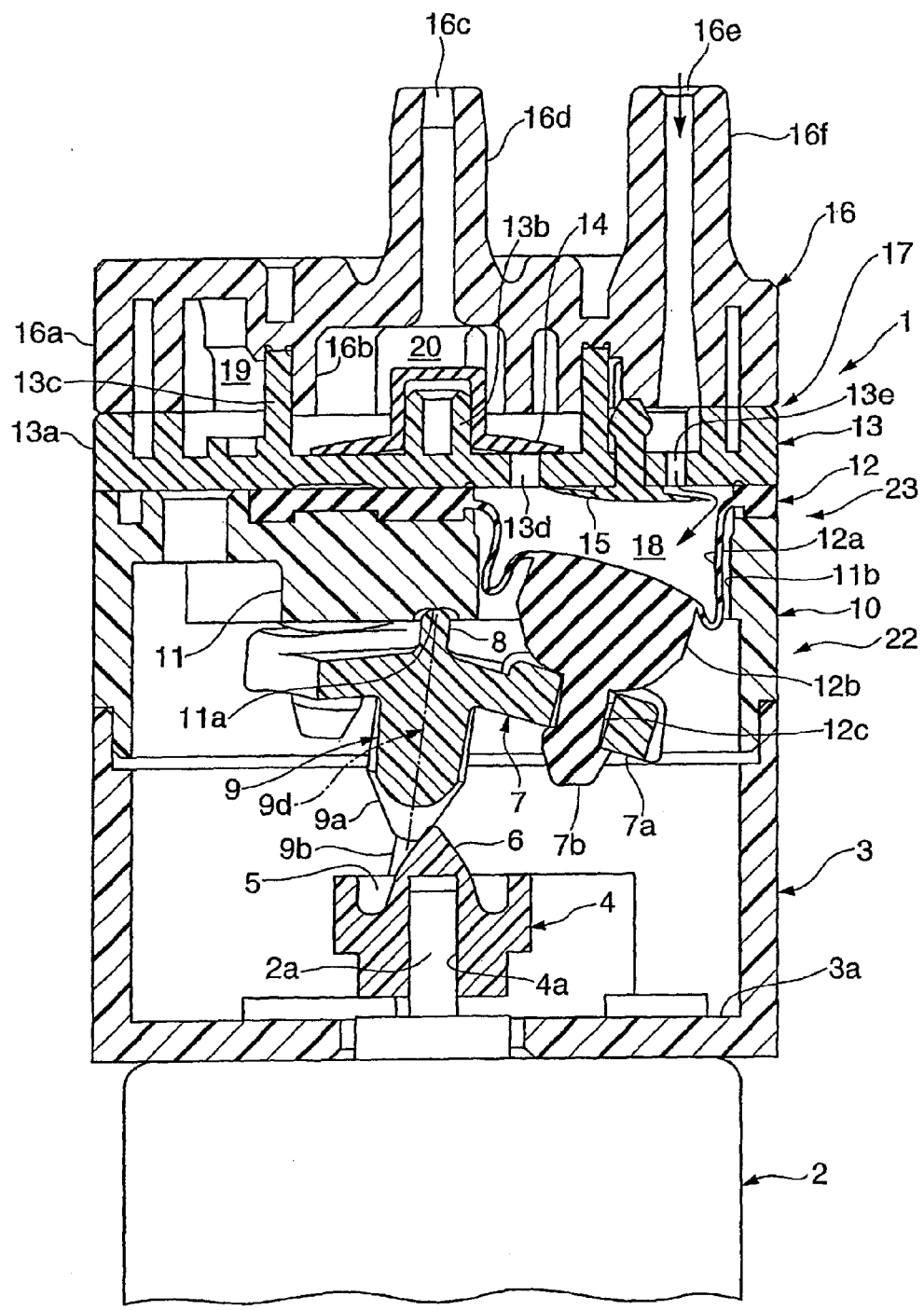
FIG. 1 is a sectional view showing a diaphragm pump according to the first embodiment of the present invention in a state in which a pump chamber expands.

The present invention will now be described in detail with reference to the accompanying drawings. Note that "upper/lower" used to explain a direction in this specification indicates a direction in the drawings for the descriptive convenience, and does not always match the upper/lower direction when actually using a diaphragm pump according to the present invention.

A diaphragm pump according to the first embodiment of the present invention will be described below with reference to FIGS. 1 to 5A and 5B. A diaphragm pump 1 according to this embodiment includes a motor 2 serving as a driving source, as shown in FIG. 1. The motor 2 is attached, via bolts, to the outside of a bottom portion 3a of a case 3 formed into a cylindrical shape with a closed bottom such that an output shaft 2a projects from a shaft hole formed in the bottom portion 3a into the case 3.

Figure 3A:
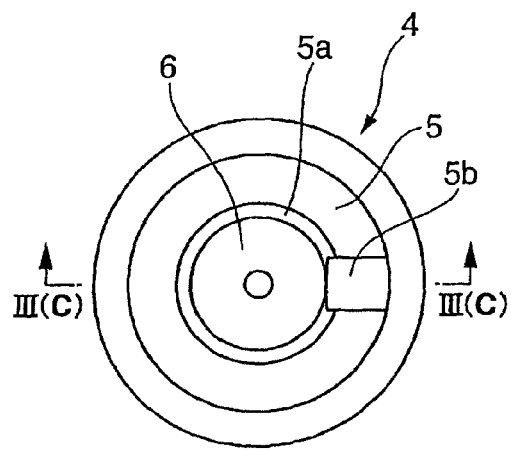
FIG. 3A is a plan view of a crank shown in FIG. 1.
Figure 3B:
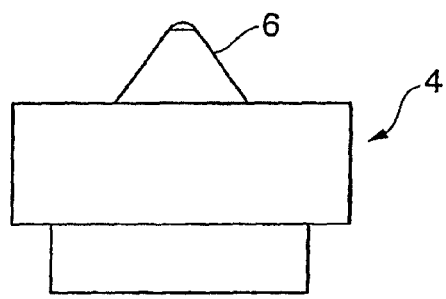
FIG. 3B is a front view of the crank shown in FIG. 1.
Figure 3C:
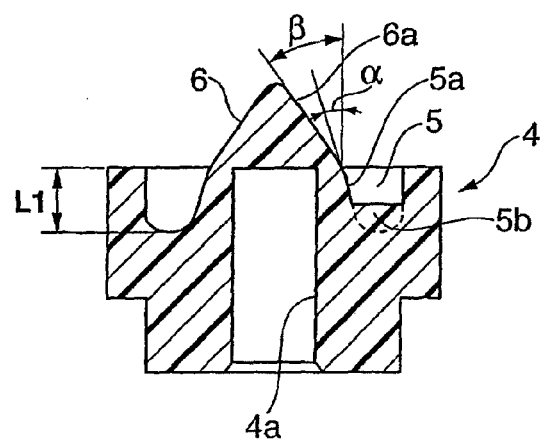
FIG. 3C is a sectional view taken along a line III(C)-III(C) in FIG. 3A.
Figure 3D:
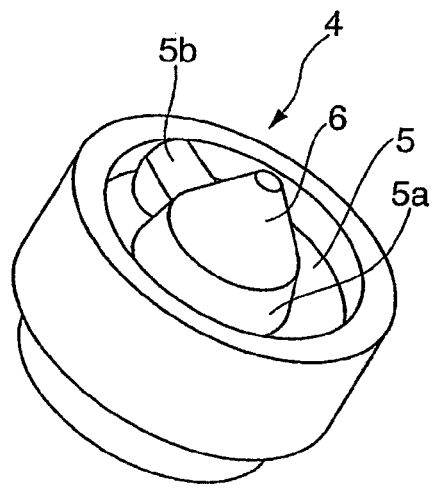
FIG. 3D is a perspective view of the crank shown in FIG. 1.

A crank 4 is formed into an almost cylindrical shape and has a non-through hole 4a extending in the vertical direction at the center of its bottom surface, in which the output shaft 2a of the motor 2 is press-fitted and pivotally attached, as shown in FIG. 3C. An insertion groove 5 having a ring shape when viewed from the upper side and extending in the circumferential direction about the non-through hole 4a (the rotation axis of the crank 4) is formed in the upper surface of the crank 4. A wall surface 5a of the insertion groove 5 on the side of the crank 4 tilts upward by an angle α with respect to the vertical direction to the side of the non-through hole 4a (the center of the crank 4). The insertion groove 5 is partially provided with an engaging portion 5b. When the crank 4 rotates, the engaging portion 5b engages with a lower end 9c of a driving shaft 9b (to be described later) inserted into the insertion groove 5 and rotates the driving shaft 9b following the rotation of the crank 4.

A conical guide portion 6 stands at a portion of the upper surface of the crank 4 surrounded by the insertion groove 5, that is, at the center of the upper surface of the crank 4. When viewed in a section, a side surface 6a of the guide portion 6 tilts by an angle β larger than the angle α with respect to the vertical direction. The lower end of the side surface 6a of the guide portion 6 and the upper end of the inner surface 5a of the above-described insertion groove 5 are continuously formed.

Figure 4A:
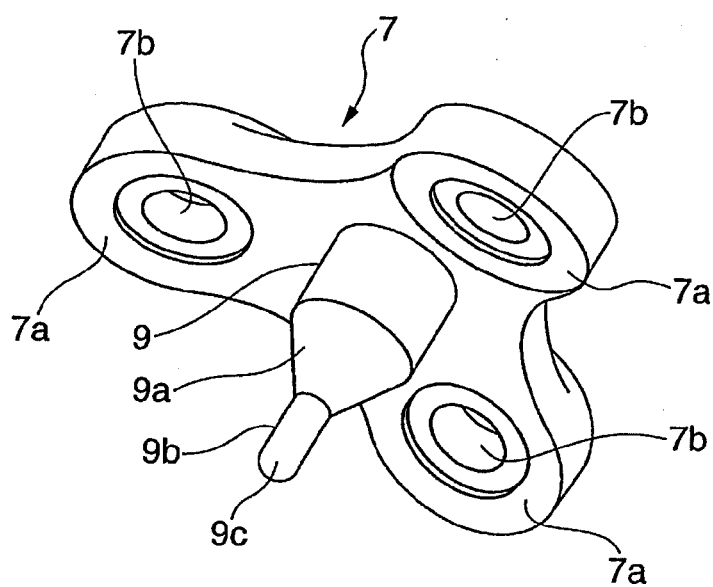
FIG. 4A is a perspective view of a driver shown in FIG. 1 when viewed from the lower side.
Figure 4B:
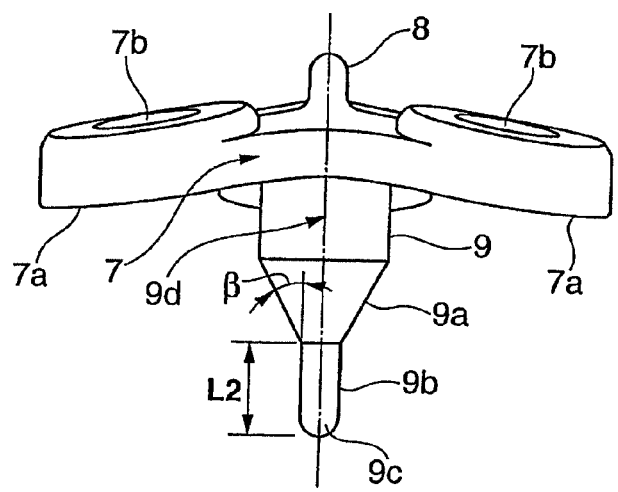
FIG. 4B is a front view of the driver shown in FIG. 1.
Figure 5A:
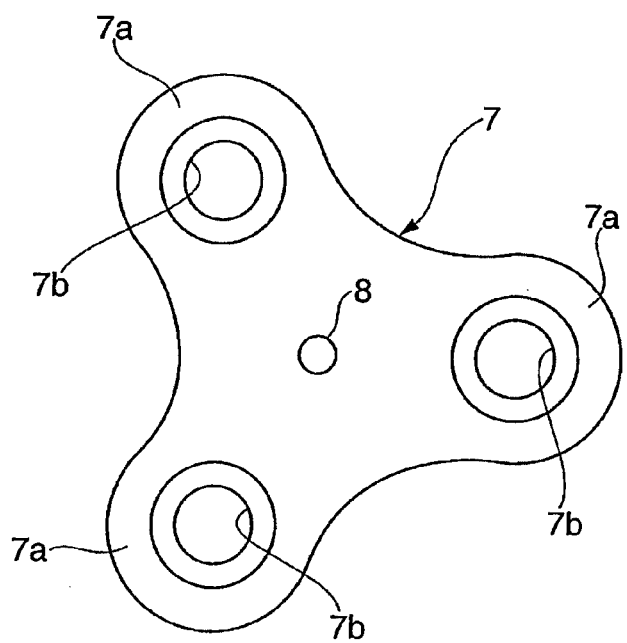
FIG. 5A is a plan view of the driver shown in FIG. 1.
Figure 5B:
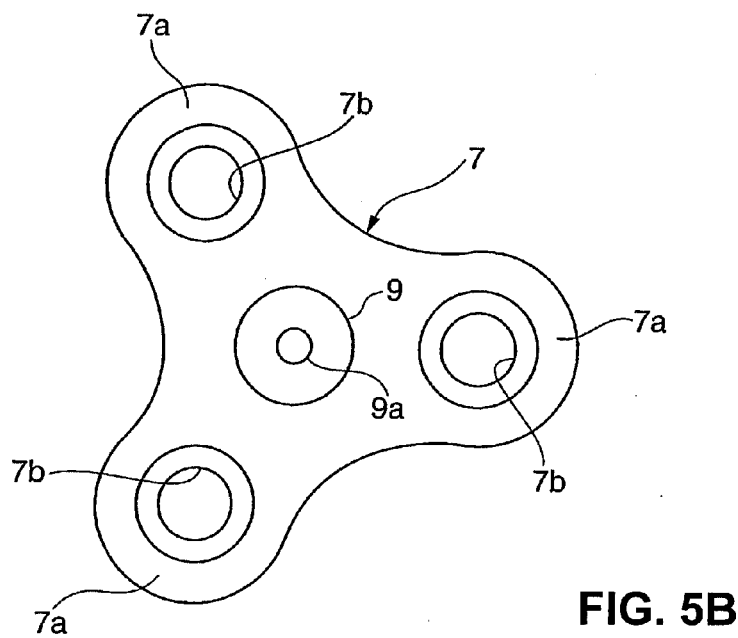
FIG. 5B is a bottom view of the driver shown in FIG. 1.

A driver 7 includes three drive elements 7a which are integrally provided at equal angles (120°) in the circumferential direction when viewed from the upper side, as shown in FIG. 5A, and project in directions perpendicular to the thickness direction. The drive elements 7a are formed to tilt downward a little at the same angle from the proximal end to the oscillation end, as shown in FIG. 4B. Each oscillation end has a diaphragm portion attachment hole 7b.

As shown in FIG. 4B, an oscillation fulcrum shaft 8 having a semispherical upper end projects upward from the center of the upper surface of the driver 7. In addition, at the center of the lower surface of the driver 7, a support portion 9 formed into a cylindrical shape, a non-slidable contact portion 9a having a truncated conical shape and provided at the lower end of the support portion 9, and the driving shaft 9b provided at the lower end of the non-slidable contact portion 9a are formed using a resin to be integrated with the driver 7 as a single member. The lower end 9c of the driving shaft 9b is formed into a semispherical shape. An axis 9d of the driving shaft 9b is oriented in a direction almost perpendicular to the extending directions of the drive elements 7a. The driving shaft 9b and the oscillation fulcrum shaft 8 are provided on the axis 9d of the driving shaft 9b so as to be oriented in directions opposing each other via the driver 7. A total length L2 of the driving shaft 9b is larger than a depth L1 of the insertion groove 5.

A diaphragm holder 10 is formed into an inverted cylindrical shape with a closed bottom and holds a diaphragm 12 to be described later. A bearing portion 11a that is formed into a concave shape to support the oscillation fulcrum shaft 8 rotatably about the axis while being able to change the tilt angle of the oscillation fulcrum shaft 8 in the axial direction is provided at the center of the lower surface of a ceiling portion 11. Three holding cylinders 11b (only one holding cylinder 11b is illustrated) each formed into a cylindrical shape are provided in the ceiling portion 11 at equal angles (120°) in the circumferential direction when viewed from the upper side.

The diaphragm 12 is made of a flexible material such as rubber and formed into an almost disk-like shape. Three thin diaphragm portions 12a are provided at equal angles (120°) in the circumferential direction when viewed from the upper side. A piston portion 12b is integrally provided under each diaphragm portion 12a. A small-diameter portion 12c is integrally provided at the lower end of the piston portion 12b. Pump chambers (to be described later) are formed from the diaphragm 12 including the diaphragm portions 12a.

A valve holder 13 serves as a partition formed into an almost cylindrical shape with a closed bottom and having a cylindrical portion 13a. An engaging convex portion 13b projects from the center of the upper surface of the bottom portion. A cylindrical partition wall 13c stands around the engaging convex portion 13b. Three discharge holes 13d (only one discharge hole 13d is illustrated) are provided around the engaging convex portion 13b on the bottom portion of the valve holder 13 at equal angles (120°) in the circumferential direction when viewed from the upper side. In addition, three suction holes 13e (only one suction hole 13e is illustrated) are provided around the partition wall 13c at equal angles (120°) in the circumferential direction when viewed from the upper side.

Figure 2:
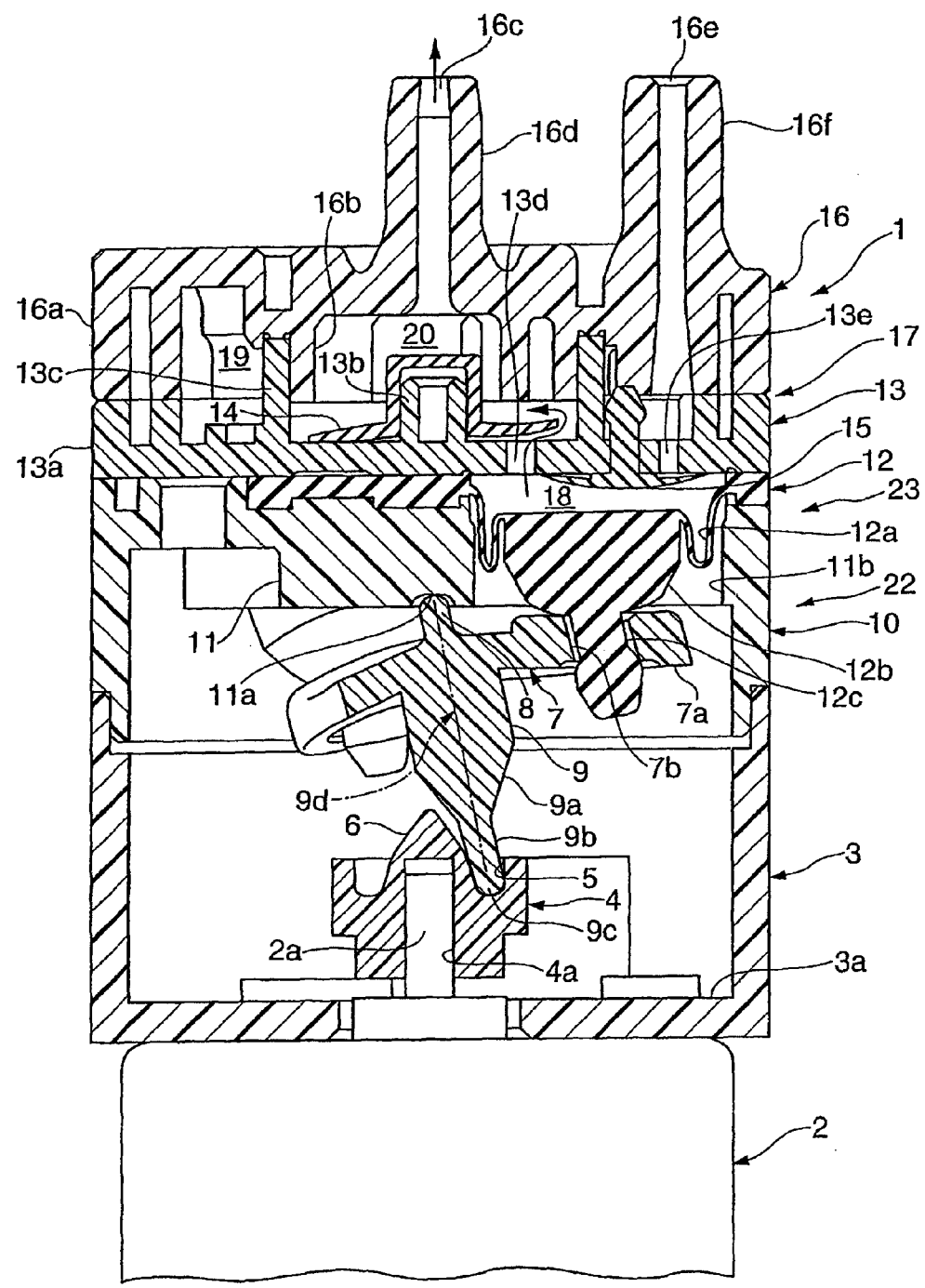
FIG. 2 is a sectional view showing the diaphragm pump shown in FIG. 1 in a contracted state.

Referring to FIGS. 1 and 2, a discharge valve 14 is formed into a hat shape and attached to the engaging convex portion 13b to open/close the discharge holes 13d. The discharge valve 14 regulates the backflow of a fluid from a discharge space 20 to be described later to pump chambers 18. A suction valve 15 is formed into an umbrella shape to open/close the suction hole 13e, and regulates the backflow of a fluid from the pump chamber 18 to the suction hole 13e.

A cover 16 is formed into an inverted cylindrical shape with a closed bottom. The cover 16 has a cylindrical portion 16a integrally projecting downward from its periphery, and a partition wall 16b formed into a cylindrical shape concentric to the cylindrical portion 16a and integrally projecting downward from its center. A discharge cylinder portion 16d having a discharge port 16c integrally stands at the center of the ceiling portion of the cover 16. A suction cylinder portion 16f having a suction port 16e' integrally stands at part of the periphery of the ceiling portion.

A method of assembling the diaphragm pump having the above-described structure will be described next. The suction valve 15 is attached to the valve holder 13 in advance. Additionally, the discharge valve 14 is attached to the engaging convex portion 13b. After stacking the cover 16 on the valve holder 13, the two members are sealed by welding or the like, thereby forming a valve holder assembly 17. In this state, a suction space 19 that has a ring shape when viewed from the upper side and makes the suction holes 13e communicate with the suction port 16e, and the discharge space 20 that makes the discharge holes 13d communicate with the discharge port 16c are formed between the cover 16 and the valve holder 13.

Next, the motor 2 is attached to the case 3 by bolts (not shown). The non-through hole 4a of the crank 4 is pressfitted on the output shaft 2a of the motor 2, thereby fixing the crank 4 on the output shaft 2a.

Each diaphragm portion 12a of the diaphragm 12 is inserted into a corresponding holding cylinder 11b of the diaphragm holder 10 to place the diaphragm 12 on the diaphragm holder 10. The small-diameter portion 12c of each piston portion 12b is attached to the diaphragm portion attachment hole 7b of a corresponding drive element 7a of the driver 7, so that the oscillation fulcrum shaft 8 of the driver 7 abuts against the bearing portion 11a of the diaphragm holder 10. The driver 7 and the diaphragm 12 are thus assembled in the diaphragm holder 10 to form a diaphragm holder assembly 22.

The valve holder assembly 17 is stacked on the diaphragm holder assembly 22 to form a pump assembly 23. In this state, the three pump chambers 18 (only one pump chamber 18 is illustrated) are formed by the valve holder 13 and the diaphragm portions 12a of the diaphragm 12. The three sets of discharge holes 13d and suction holes 13e correspond to the pump chambers 18, respectively. Next, the pump assembly 23 is lowered from above the case 3 down onto the case 3, thereby inserting the lower end 9c of the driving shaft 9b of the driver 7 into the insertion groove 5 of the crank 4. At this time, the conical guide portion 6 is provided at the portion of the crank 4 surrounded by the insertion groove 5, and the lower end of the side surface 6a of the guide portion 6 and the upper end of the inner surface 5a of the insertion groove 5 are continuously formed. Hence, the lower end 9c of the driving shaft 9b abuts against the side surface 6a of the guide portion 6, moves downward while being guided by the side surface 6a, and is inserted into the insertion groove 5.

In this state, as shown in FIG. 2, the lower end of the driver 7 is supported by the insertion groove 5 via the driving shaft 9b, and the oscillation fulcrum shaft 8 at the upper end of the driver 7 abuts against the bearing portion 11a of the diaphragm holder 10. The driving shaft 9b inserted into the insertion groove 5 leans against the wall surface 5a on the side of the non-through hole 4a. The axis 9d of the driving shaft 9b tilts by the angle α with respect to the vertical direction. Since the total length L2 of the driving shaft 9b is larger than the depth L1 of the insertion groove 5, and the outer peripheral surface of the non-slidable contact portion 9a tilts by the angle β, the outer peripheral surface of the non-slidable contact portion 9a is spaced apart from the guide portion 6 and is in a non-contact state with respect to the guide portion 6.

Since the driving shaft 9b is inserted into not a hole but the insertion groove 5 formed into a ring shape, the insertion operation becomes easy, and workability in assembly improves. The lower end 9c of the driving shaft 9b is inserted into the insertion groove 5 of the crank 4 only by lowering the driver 7. This obviates the cumbersome operation requiring experience and skill, that is, the operation of fitting the non-through hole, from above, on the driving shaft tilted with respect to the vertical direction in a state in which the opening of the non-through hole is orientated downward. In addition, since the guide portion 6 that guides the lower end 9c of the driving shaft 9b is provided in the insertion groove 5, the lower end 9c can more reliably be inserted into the insertion groove 5. It is therefore possible to easily introduce assembly automation.

The pump assembly 23 and the case 3 are integrated using a spring (not shown), thereby forming the diaphragm pump 1.

The pump action of the diaphragm pump 1 having the above-described structure will be described next. When the motor 2 is driven to rotate the crank 4 via the output shaft 2a, the engaging portion 5b of the insertion groove 5 engages with the lower end 9c of the driving shaft 9b. The driving shaft 9b then rotates following the rotation of the crank 4 while remaining engaged with the engaging portion 5b and changing the tilt direction of the axis 9d. Hence, the oscillation ends of the three drive elements 7a sequentially oscillate in the upward/downward direction.

When the oscillation end of the first drive element 7a moves downward, the first pump chamber 18 expands via the piston portion 12b, as shown in FIG. 1, and the air in the pump chamber 18 is set to a negative pressure. Hence, blocking of the suction hole 13e by the suction valve 15 is canceled, and the suction hole 13e is opened. In this state, air sucked from the external atmosphere via the suction port 16e of the cover 16 passes through the suction hole 13e via the suction space 19 and flows into the first pump chamber 18.

Next, when the oscillation end of the drive element 7a of the first pump chamber 18 that has expanded moves upward, the first pump chamber 18 contracts, as shown in FIG. 2, and the pressure of the air in the first pump chamber 18 rises. Blocking of the discharge hole 13d by the discharge valve 14 is canceled, and the discharge hole 13d is opened. The air in the first pump chamber 18 passes from the discharge hole 13d through the discharge port 16c via the discharge space 20 and is supplied to a pressurization target connected to an air tube (not shown) or the like.

When the crank 4 further rotates via the output shaft 2a, and the oscillation end of the second drive element 7a moves downward, the second pump chamber 18 expands, and the air in the pump chamber 18 is set to a negative pressure. Hence, blocking of the suction hole 13e by the suction valve 15 is canceled, and the suction hole 13e is opened. In this state, air sucked from the external atmosphere via the suction port 16e of the cover 16 passes through the suction hole 13e via the suction space 19 and flows into the second pump chamber 18.

Next, when the oscillation end of the drive element 7a of the second pump chamber 18 that has expanded moves upward, the pump chamber 18 contracts, and the pressure of the air in the pump chamber 18 rises. Blocking of the discharge hole 13d by the discharge valve 14 is canceled, and the discharge hole 13d is opened. The air in the second pump chamber 18 passes from the discharge hole 13d through the discharge port 16c via the discharge space 20 and is supplied to the pressurization target connected to the air tube (not shown) or the like.

When the crank 4 further rotates via the output shaft 2a, and the oscillation end of the third drive element 7a moves downward, the third pump chamber 18 expands, and the air in the pump chamber 18 is set to a negative pressure. Hence, blocking of the suction hole 13e by the suction valve 15 is canceled, and the suction hole 13e is opened. In this state, air sucked from the external atmosphere via the suction port 16e of the cover 16 passes through the suction hole 13e via the suction space 19 and flows into the third pump chamber 18.

Next, when the oscillation end of the drive element 7a of the third pump chamber 18 that has expanded moves upward, the pump chamber 18 contracts, and the pressure of the air in the third pump chamber 18 rises. Blocking of the discharge hole 13d by the discharge valve 14 is canceled, and the discharge hole 13d is opened. The air in the third pump chamber 18 passes from the discharge hole 13d through the discharge port 16c via the discharge space 20 and is supplied to the pressurization target connected to the air tube (not shown) or the like. In this way, the three pump chambers 18 sequentially perform the expansion/contraction operation. Hence, the air with little pulsatile flow is continuously supplied from the discharge port 16c to the pressurization target.

In addition, the upper end of the driver 7 is supported by the bearing portion 11a of the diaphragm holder 10 via the oscillation fulcrum shaft 8, and each drive element 7a oscillates about the oscillation fulcrum shaft 8. For this reason, each drive element 7a has a predetermined oscillation width, and a stable oscillation operation can be obtained. When the expansion/contraction operation of the pump chambers 18 stabilizes without variations, the amount of air supplied from the pump chambers 18 becomes constant. It is therefore possible to regulate a pulsating flow by the supplied air.

Figure 6:
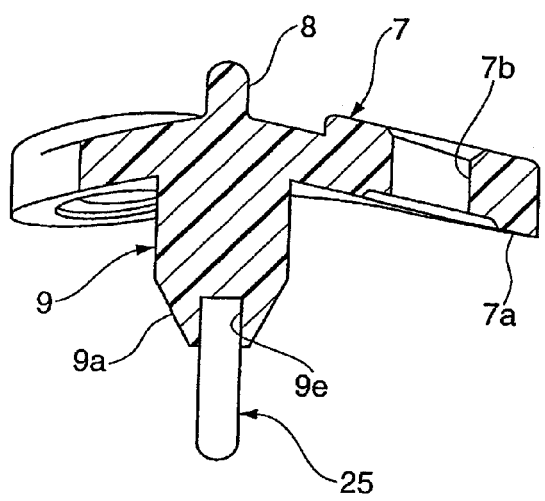
FIG. 6 is a sectional view of a driver in a diaphragm pump according to the second embodiment of the present invention.

The second embodiment of the present invention will be described next with reference to FIG. 6. As the characteristic feature of the second embodiment, a driving shaft 25 is not formed using a resin to be integrated with a driver 7 but integrally formed as a member different from the driver 7. For example, the driving shaft 25 made of a metal is integrally molded and unitized with the driver 7 made of a resin. A non-through hole 9e is formed at the center of the lower end of a non-slidable contact portion 9a. One end of the driving shaft 25 formed from a metal or slidable member is press-fitted and fixed in the non-through hole 9e. When the driving shaft 25 that receives a relatively large load with respect to an insertion groove 5 is formed from a metal or slidable member, the durability and wear resistance of the driving shaft 25 can be improved.

Figure 7:
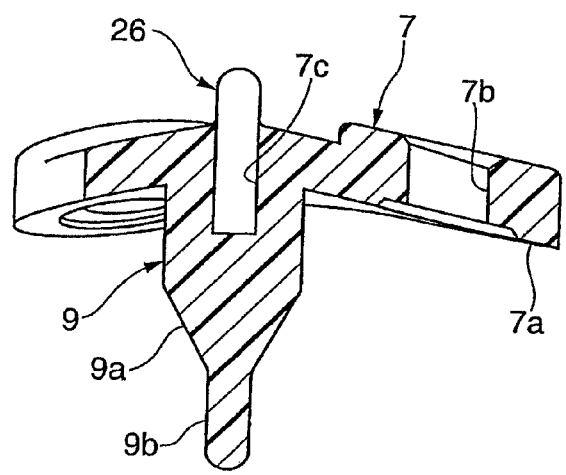
FIG. 7 is a sectional view of a driver in a diaphragm pump according to the third embodiment of the present invention.

The third embodiment of the present invention will be described next with reference to FIG. 7. As the characteristic feature of the third embodiment, a driving shaft 9b is formed using a resin to be integrated with a driver 7, whereas an oscillation fulcrum shaft 26 is formed from a member (material) different from the driver 7. For example, the oscillation fulcrum shaft 26 made of a metal is integrally molded with the driver 7 made of a resin. A non-through hole 7c is formed at the center of the upper surface of the driver 7. One end of the oscillation fulcrum shaft 26 formed from a metal or slidable member is press-fitted and fixed in the non-through hole 7c. The third embodiment is effective for a vacuum diaphragm pump in which a relatively large load acts on the oscillation fulcrum shaft 26.

Figure 8:
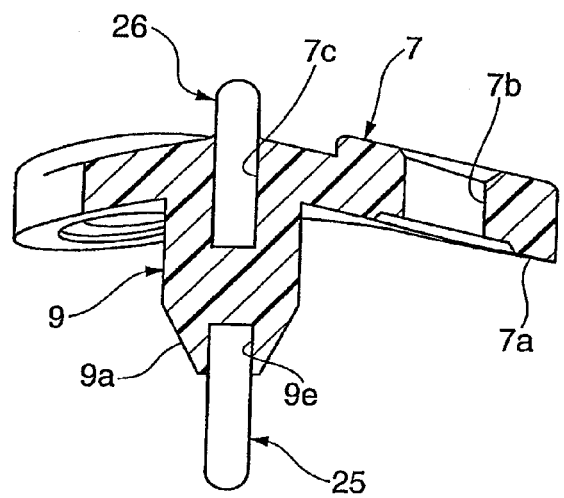
FIG. 8 is a sectional view of a driver in a diaphragm pump according to the fourth embodiment of the present invention.

The fourth embodiment of the present invention will be described next with reference to FIG. 8. In the fourth embodiment, the above-described second and third embodiments are simultaneously employed. A driving shaft 25 and an oscillation fulcrum shaft 26 are formed from members (materials) different from a driver 7. For example, the driving shaft 25 and the oscillation fulcrum shaft made of a metal are integrally molded and unitized with the driver 7 made of a resin. Having both the functions of the second and third embodiments, the fourth embodiment is applicable to both a pressurized type and a vacuum type and therefore has high versatility.

Figure 9:
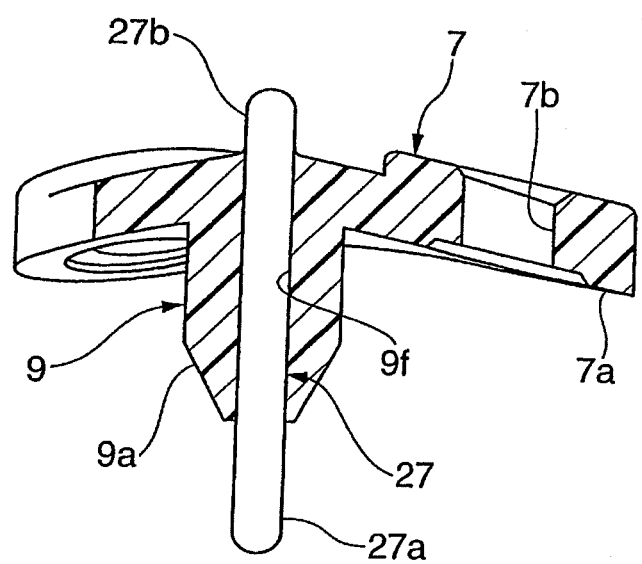
FIG. 9 is a sectional view of a driver in a diaphragm pump according to the fifth embodiment of the present invention.

The fifth embodiment of the present invention will be described next with reference to FIG. 9. In the fifth embodiment, one driving shaft 27 is press-fitted and fixed in a through hole 9f extending through a driver 7 and a support portion 9. For example, the driving shaft 27 made of a metal is integrally molded and unitized with the driver 7 made of a resin. A lower portion 27a of the driving shaft 27 projects downward from the support portion 9 and is inserted into an insertion groove 5 of a crank 4 described above. An upper portion 27b projecting upward from the driver 7 is supported by a bearing portion 11a of a diaphragm holder 10. In the fifth embodiment, since the one driving shaft 27 also serves as the oscillation fulcrum shaft, the number of components and the number of assembly steps can be decreased, as compared to the fourth embodiment.

According to the above-described embodiments, since the driving projection 9b is formed integrally with the driver 7, it need not be formed as another member, and the number of components can be decreased. In addition, the step of pivotally attaching the driving shaft in a tilted state to the crank 4 as in the related art is unnecessary.

Note that in the above-described embodiments, the insertion groove 5 extending in the circumferential direction is formed in the crank 4. In place of the insertion groove 5, a non-through hole may be used, which tilts with respect to the non-through hole 4a at a position displaced from the non-through hole 4a and, when the driving projection 9b is inserted, pivotally and rotatably supports the driving projection 9b. In the embodiments, a so-called three-cylinder diaphragm pump including the three pump chambers 18 has been described. The embodiments are also applicable to a diaphragm pump including two or less, or four or more cylinders, as a matter of course. The engaging portion 5b is molded integrally with the crank 4. However, the engaging portion 5b may be formed from a member different from the crank 4 using a slidable member or the like and fixed in the insertion groove 5 of the crank 4 by fitting or the like.

The guide portion 6 is formed into a conical shape. However, the present invention is not limited to this. The guide portion 6 may be formed into a columnar shape, or need only have a shape capable of guiding the driving shaft 9b abutting against it into the insertion groove 5 when the driver 7 is moved downward. A so-called three-cylinder diaphragm pump including the three pump chambers 18 has been described. The embodiments are also applicable to a diaphragm pump including two or less, or four or more cylinders, as a matter of course.

EXPLANATION OF THE REFERENCE NUMERALS AND SIGNS

1 . . . diaphragm pump, 2 . . . motor, 4 . . . crank, 5 . . . insertion groove, 5b . . . engaging portion, 7 . . . driver, 9b, 25, 27 . . . driving shaft, 12 . . . diaphragm, 12a . . . diaphragm portion, 18 . . . pump chamber

The invention claimed is:

1. A diaphragm pump comprising:
a motor serving as a driving source;
a crank that is rotated by said motor and has a ring-shaped insertion groove in an upper surface;
a pump chamber that is formed from a diaphragm including a diaphragm portion and expands/contracts in accordance with reciprocal motion of said diaphragm portion wherein said insertion groove opens toward said diaphragm;
a driver that reciprocally moves said diaphragm portion by an oscillation operation;
a driving shaft that projects from said driver and engages with said insertion groove of said crank so as to orbit a rotation axis of said crank, a lower end of said driving shaft contacting with an inner surface of said insertion groove; and
an engaging portion that is formed in said insertion groove, and engages with said driving shaft to make said driving shaft follow the rotation of said crank,
wherein said driving shaft and said driver are integrally formed from a single material or different materials.

2. A diaphragm pump according to claim 1, wherein said driving shaft and said driver are integrally formed from a resin.

3. A diaphragm pump according to claim 1, wherein said driving shaft and said driver are made of a metal and a resin, respectively, and integrally molded.

4. A diaphragm pump according to claim 1, wherein said ring-shaped insertion groove is formed so as to have the rotation axis of said crank as the center.

5. A diaphragm pump according to claim 4, further comprising:
a conical guide portion that is formed on the upper surface of said crank surrounded by said insertion groove and guides said driving shaft into said insertion groove.

6. A diaphragm pump according to claim 5, further comprising:
an oscillation fulcrum shaft that projects from said driver to a side opposite to said driving shaft coaxially with respect to said driving shaft;
a cylindrical holder member that holds said pump chamber; and
a bearing portion of said oscillation fulcrum shaft formed on said holder member.

* * * * *